July 7, 1959

K. ILENS 2,893,794

FLUID SEAL

Filed Aug. 27, 1957

INVENTOR.
KARLIS ILENS
BY

ATTORNEY

United States Patent Office 2,893,794
Patented July 7, 1959

2,893,794

FLUID SEAL

Karlis Ilens, Kalamazoo, Mich., assignor to Cleveland Pneumatic Industries, Inc., a corporation of Ohio Application August 27, 1957, Serial No. 680,570

4 Claims. (Cl. 309—22)

This invention relates generally to fluid seals and more particularly to a fluid seal adapted for use in rotary fluid motors.

It is an important object of this invention to provide a new and improved fluid seal suitable for use in rotary fluid motors.

It is another important object of this invention to provide a fluid seal capable of sealing between two relatively movable parts having sharp corners.

Further objects and advantages will appear from the following description and drawings, wherein.

Figure 1:
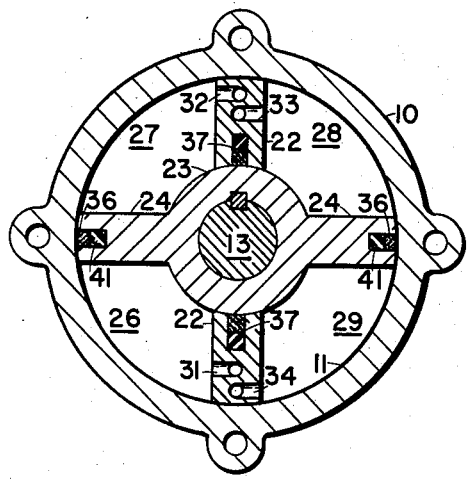
Figure 1 is a plan view of a typical rotary fluid motor incorporating a seal according to this invention.
Figure 2:
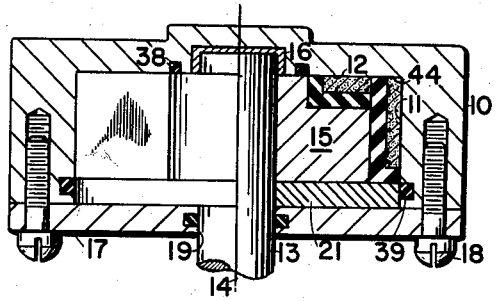
Figure 2 is a side elevation partially in section.
Figure 3:
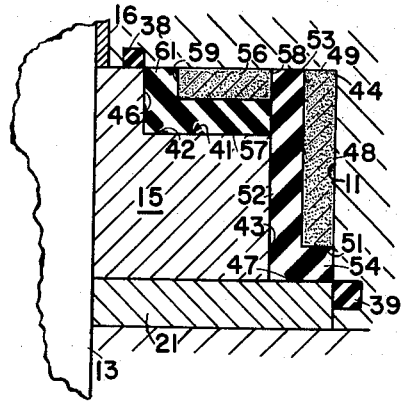
Figure 3 is an enlarged fragmentary side elevation showing the details of a preferred seal structure.

A typical rotary fluid motor includes a body 10 formed with a bore 11 terminating in an end wall 12. An output shaft 13 is journaled within the bore 11 for rotation on its center axis 14 and is supported by a bearing 16. A cover 17 is mounted on the body 10 by fasteners 18 and is formed with a central aperture 19 through which the shaft 13 projects. A rotor 15 is formed with a cylindrical hub 23 keyed to the shaft 13 for rotation about the axis 14. A circular disk 21 is also keyed to the shaft 13 and is proportioned so that its periphery is adjacent to the wall of the bore 11. Fixed vanes 22 are mounted on the body 10 and extend axially between the end wall 12 and the disk 21 and radially between the surface of the bore 11 and the hub 23. The rotor 15 is formed with rotor vanes 24 which extend axially between the end wall 12 and the disk 21 and radially between the hub 23 and the wall of the bore 11.

The fixed vanes 22 and the rotor vanes 24 co-operate to divide the zone within the bore 11 into four variable volume chambers 26, 27, 28, and 29. Those skilled in the art will recognize that rotation of the rotor 15 in a clockwise direction as viewed in Figure 1 causes the two chambers 27 and 29 to be reduced in volume and the two chambers 26 and 28 to be increased in volume while rotation in the opposite direction causes the opposite action. The fixed vanes 22 are formed with ports 31, 32, 33, and 34, which communicate with the chambers 26, 27, 28, and 29, respectively, and connect to a pressure fluid system through a 4-way valve (not shown). If fluid under pressure is connected to the ports 31 and 33 and the ports 32 and 34 are connected to the reservoir return the fluid under pressure will produce clockwise rotation of the rotor 15. Conversely, if the opposite connections are made the chambers 27 and 29 will be pressurized and rotor 15 will rotate in the counterclockwise direction. Thus far, the fluid motor is typical and forms no part of this invention excepting insofar as it co-operates with the preferred seal.

In order to prevent leakage of fluid between the various chambers, seal assemblies 36 are carried by the rotor vanes 24 which engaged with the walls of the bore 11 and the end wall 12 and similar seal assemblies 37 are mounted on the fixed vanes 22 for engagement with the hub 23 and the disk 21. In addition an O ring seal 38 is mounted in the body 10 to engage the upper end of the hub 23 and an O ring seal 39 is mounted on the body 10 to engage with the periphery of the disk 21. Each rotor vane 24 is formed with a channel 41 having a first portion 42 adjacent to the end wall 12 and a second portion 43 adjacent to the wall of the bore 11. A dynamic seal element 48, preferably of rectangular cross section, is positioned in the second channel portion 43 and extends from one end 49 at the intersection of the end wall 12 and the wall of the bore 11 at the corner 44 to its other end 51 slightly spaced from the channel wall 47. Positioned between the seal element 48 and the bottom of the channel portion 43 is an L shaped backing member 52 formed of rubber or a rubber like material which extends into an engagement at its upper end 53 with the end wall 12 and is formed with a lateral projection 54 which extends into engagement with the wall of the bore 11 between the end 51 of the seal element 48 and the channel end wall 47.

Positioned within the channel portion 42 is a second seal element 56, preferably formed with the rectangular cross section, which engages and seals with the end wall 12. A backing member 57 of rubber or a rubber like material extends between the bottom of the channel portion 42 and the seal elements 56 and is formed with a lateral projection which extends between an end 59 of the seal element 56 and the end wall 46 of the channel portion 42 into engagement with the end wall 12. One end 58 of the seal elements 56 engages the backing member 52 and the other end 59 engages a lateral projection 61 on the backing member 57 so it is longitudinally positioned between the backing members 52 and 57.

The various elements should be proportioned so that the two backing members 52 and 57 are slightly compressed when the rotor 15 is assembled within the body 10 so that the two seal elements 48 and 56 are resiliently urged into engagement with the surfaces against which they seal. In effect, the two seal elements 48 and 56 are supported in a floating manner within the channel 41 and are retained in engagement with the surface of the bore 11 and the end wall 12 respectively. When fluid under pressure is supplied to any of the chambers 26 through 29 the rubber of the backing members 52 and 57 is compressed and operates to transmit this compression force to the seal elements 48 and 56 so the sealing force on the seal elements is a function of the pressure of the fluid sealed. Because the rubber like material of the backing members tends to act as a fluid and transmit its internal pressure in all directions the backing member 52, through the section 54, produces an axial force on the seal element 48 which maintains the end 49 in sealing engagement with the end wall 12. In a similar manner the two ends of the seal element 56 are maintained in engagement with the backing members 52 and 57 so all the surfaces of the sealing elements are sealed and leakage is prevented. Even though the ends of the backing member engage the end wall 12 and the wall of the bore 11 and form a dynamic seal therewith, any wear which would tend to occur does not become significant because the area of engagement is so small when compared to the volume of the backing members.

Preferably, the seal elements 48 and 56 are formed of a relatively hard material having good wearing qualities when operating in the fluid used to power the motor. It has been found at actual practice that hydraulic motors of this type operate very effectively if the seal members 48 and 56 are formed of carbon. Carbon is desirable since it tends to have self-lubricating qualities and provides a satisfactory service life. Also, since carbon is relatively rigid it seals in the corner at the intersection of the end surface 12 and the wall of the bore 11. It is contemplated that other semi-rigid materials such as nylon or Teflon could be used to form the seal elements 48 and 56 depending upon the type of fluid used and the particular characteristics desired. It should be understood that the backing members 52 and 57 are not subjected to wear, since there is essentially no relative movement between the seal elements 52 and 56 and the wall of the channel 41, so soft rubber is a satisfactory material for this part of the seal. The rubber provides a seal between the seal elements 48 and 56 and the walls of the channel 41 so leakage is prevented past the vanes. It should be understood that the seal assemblies 37 are formed in the same manner as the assemblies 36 excepting that the channel is formed in the fixed vanes 22 and the seal assemblies 37 engage the surface of the hub 23 and the upper surface of the disk 21 to provide a dynamic seal therewith.

Although the preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description is determinative of the scope of the invention.

I claim:

1. A fluid device having a pair of relatively movable parts, one of said parts being formed with first and second surfaces intersecting at a corner, the other of said parts being movable along said surfaces, a channel in said other part open adjacent to said first and second surfaces, an elongated relatively rigid element positioned in said channel engaging and sealing against a portion of the length of said first surface to said corner and terminating in a first end engaging and sealing against said second surface adjacent to said corner, a resilient member in said channel between the bottom thereof and said element exerting a sealing force on said element and extending into sealing engagement with said second surface adjacent to said element first end, and into sealing engagement with another portion of the length of said first surface adjacent to the other end of said element.

2. A fluid device having a pair of relatively movable parts, one of said parts being formed with first and second surfaces intersecting at a corner, the other of said parts being movable along said surfaces, a channel in said other part open adjacent to said first and second surfaces, an elongated relatively rigid element positioned in said channel engaging and sealing against said first surface to said corner and terminating in a first end engaging and sealing against said second surface adjacent to said corner, a resilient member in said channel between the bottom thereof and said element exerting a sealing force on said element and extending into sealing engagement with said second surface adjacent to said element first end and having a laterally projecting section engaging the end of said element opposite said first end and said first surface adjacent thereto.

3. A fluid device having a pair of relatively movable parts, one of said parts being formed with first and second surfaces intersecting at a corner, the other of said parts being movable along said surfaces, a channel in said other part having first and second portions open adjacent to said first and second surfaces respectively, an elongated element positioned in said first portion engaging and sealing against said first surface to said corner and terminating in a first end engaging and sealing against said second surface adjacent to said corner, a second elongated element in said second portion engaging and sealing against said second surface and terminating in a first end spaced from said first element, a first resilient member in said first portion between the bottom thereof and said first element exerting a sealing force on said first element and extending between said first end of said second element and said first element and having a laterally projecting section engaging the end of said second element opposite said first end, and a second resilient member in said second portion between the bottom thereof and said second element exerting a sealing force on said second element and having a laterally projecting section engaging the other end of said second element.

4. A fluid device having a pair of relatively movable parts, one of said parts being formed with first and second surfaces intersecting at a corner, the other of said parts being movable along said surfaces, a channel in said other part having first and second portions open adjacent to said first and second surfaces respectively, an elongated element positioned in said first portion engaging and sealing against said first surface to said corner and terminating in a first end engaging and sealing against said second surface adjacent to said corner, a second elongated element in said second portion engaging and sealing against said second surface and terminating in a first end spaced from said first element, a first resilient member in said first portion between the bottom thereof and said first element exerting a sealing force on said first element and extending between said first end of said second element and said first element and having a laterally projecting section engaging the end of said second element opposite said first end, and a second resilient member in said second portion between the bottom thereof and said second element exerting a sealing force on said second element.

References Cited in the file of this patent

UNITED STATES PATENTS

| | | |
|---|---|---|
| 898,516 | Shevlin | Sept. 15, 1908 |
| 1,077,568 | Sullivan et al. | Nov. 4, 1913 |
| 2,550,180 | Allen | Apr. 24, 1951 |
| 2,607,644 | Smith et al. | Aug. 19, 1952 |
| 2,735,406 | Britton | Feb. 21, 1956 |

FOREIGN PATENTS

| | | |
|---|---|---|
| 627,085 | Great Britain | July 28, 1949 |